(12) United States Patent
Luft

(10) Patent No.: US 6,183,020 B1
(45) Date of Patent: Feb. 6, 2001

(54) COUPLING DEVICE

(75) Inventor: Thomas Luft, Au am Rhein (DE)

(73) Assignee: Aeroquip Corporation, Maumee, OH (US)

( * ) Notice: Under 35 U.S.C. 154(b), the term of this patent shall be extended for 0 days.

(21) Appl. No.: 09/154,004

(22) Filed: Sep. 16, 1998

(30) Foreign Application Priority Data

Sep. 30, 1997 (DE) .............................. 197 43 065
Mar. 21, 1998 (DE) .............................. 198 12 544

(51) Int. Cl.$^7$ ...................................................... F16L 35/00
(52) U.S. Cl. ................... 285/93; 285/39; 285/321
(58) Field of Search ................ 285/39, 93, 321, 285/308

(56) References Cited

U.S. PATENT DOCUMENTS

| 3,398,977 | * | 8/1968 | Yoneda ................................... 285/39 |
| 3,731,955 | | 5/1973 | Borsum et al. . |
| 4,240,654 | * | 12/1980 | Gladieux ............................... 285/321 |
| 4,471,978 | * | 9/1984 | Kramer ................................... 285/39 |
| 4,781,400 | * | 11/1988 | Cunningham .......................... 285/39 |
| 4,793,637 | * | 12/1988 | Laipply et al. ........................ 285/39 |
| 4,884,829 | | 12/1989 | Funk et al. . |
| 4,915,420 | * | 4/1990 | Washizu ................................. 285/39 |
| 5,226,682 | | 7/1993 | Marrison et al. . |
| 5,553,895 | | 9/1996 | Karl et al. . |
| 5,570,910 | | 11/1996 | Highlen . |
| 5,752,726 | * | 5/1998 | Fixemer ................................. 285/39 |
| 5,934,709 | * | 8/1999 | Morrison ............................... 285/39 |

FOREIGN PATENT DOCUMENTS

| 195 15 849 A1 | | 10/1995 | (DE) . |
| 1533785 | * | 11/1978 | (GB) ..................................... 285/39 |
| 2174163 | * | 10/1986 | (GB) ..................................... 285/39 |

* cited by examiner

*Primary Examiner*—Eric K. Nicholson
(74) *Attorney, Agent, or Firm*—Emch, Schaffer, Schaub & Porcello, Co., L.P.A.

(57) ABSTRACT

This invention relates to a coupling device to connect two tubular elements, preferably a hose with a tube, with one male coupling element (3) and one female coupling element (5) that are formed so that they can be inserted in one another and can be locked by means of an expandable split clip (33). An axially movable release device (35) interacts with the split clip to release the lock. The invention is characterized by the fact that the release device (35) has an indicator element which indicates a connection between the two coupling elements (3, 5).

13 Claims, 4 Drawing Sheets

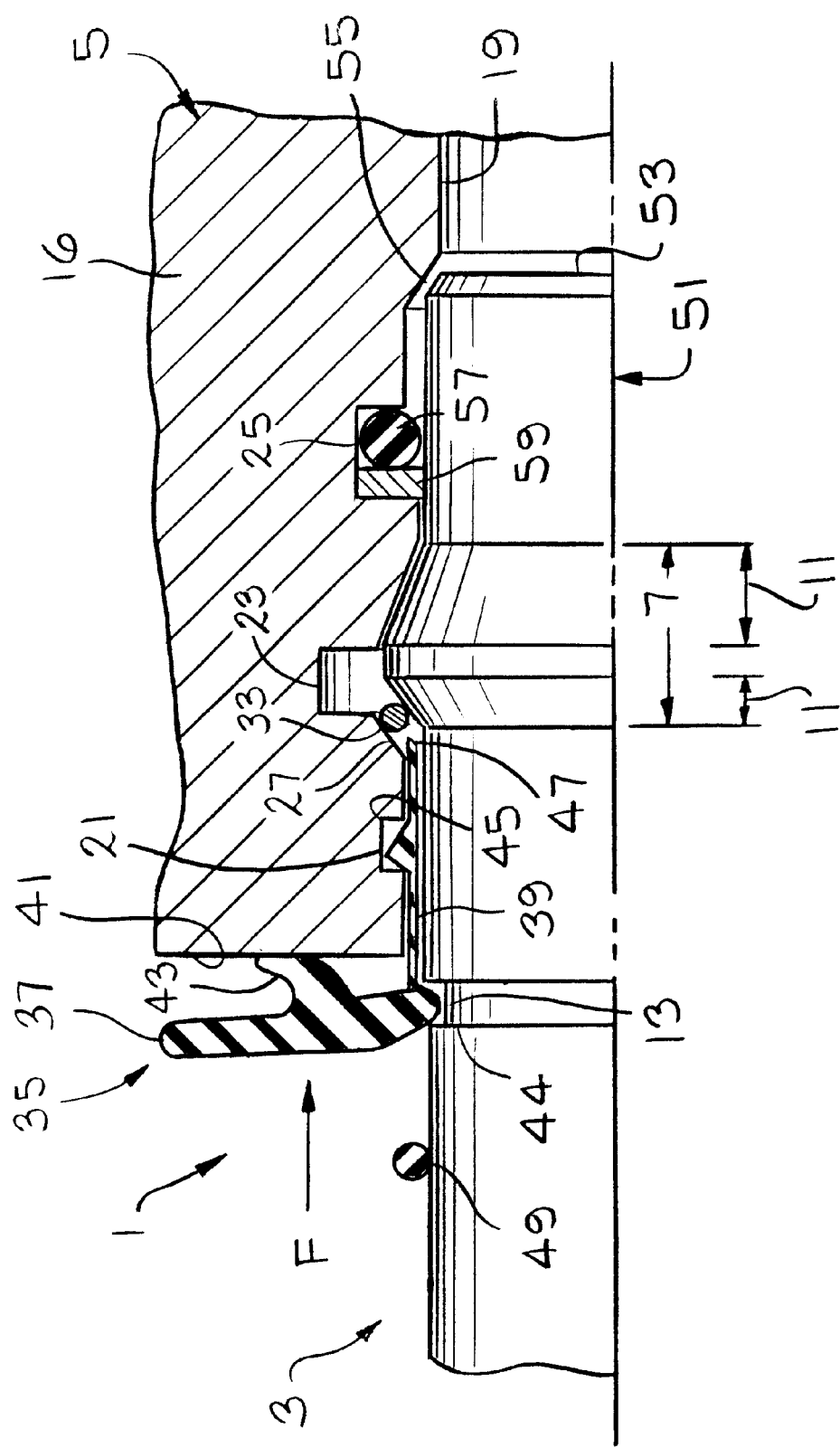

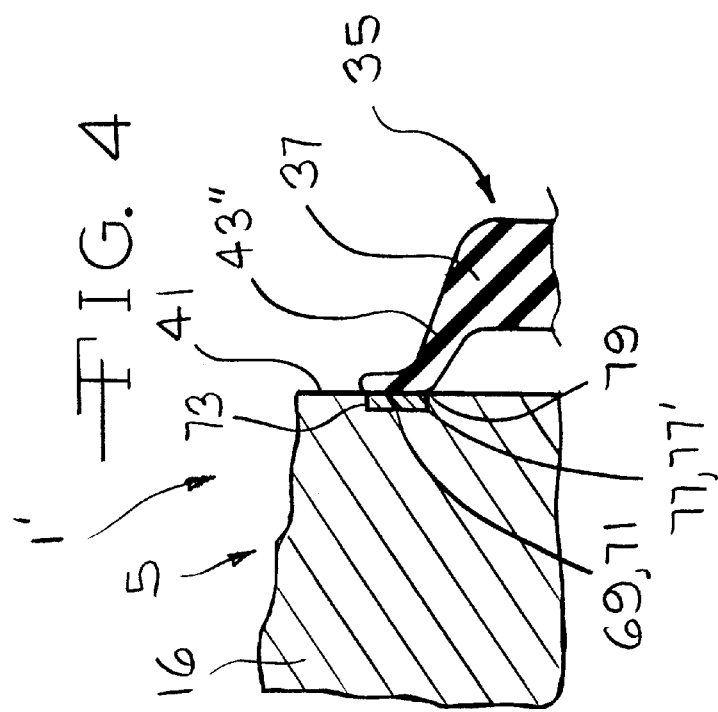
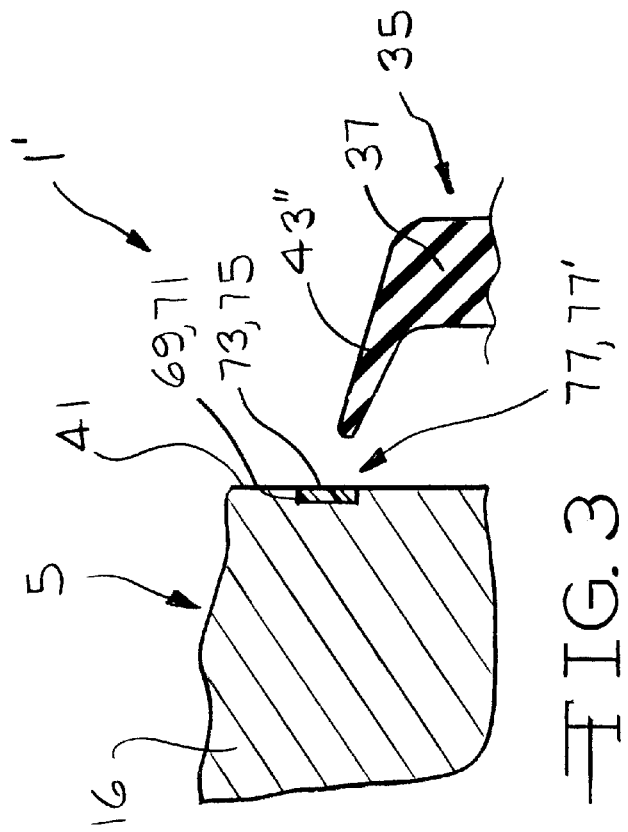

COUPLING DEVICE

DESCRIPTION

This invention relates to a coupling device for the connection of two preferably tubular elements, such as a hose and/or of a tube, with one male coupling element and one female coupling element. The device is designed so that the male coupling element can be inserted in the female coupling element and they can be locked by means of an expandable split ring, and an axially moveable release device with interacts with the split ring to release the lock.

A similar coupling device of the prior art is described in U.S. Pat. No. 5,553,895. One disadvantage of the coupling device described in this prior art publication, however, is that it is not possible in all cases to guarantee a proper connection or a correctly coupled state of the two coupling elements.

The object of this invention is therefore to provide a coupling device which makes possible a visual and/or tactile verification of a correct connection of the two coupling elements without major effort or expense in the construction of the coupling.

The invention teaches that this object can be accomplished by a coupling device that has the characteristics disclosed herein. Because the release device has an indicator element, it becomes possible to verify the connection by means of simple design measures. When coupling the two elements, the user thus has an immediate indication whether the coupling elements have been correctly coupled. As a result of the functional connection of the indicator element with the release device, a very simple and economical solution is achieved in which the number of additional components is kept to a minimum.

In one advantageous refinement of the invention, the release device comprises a first and preferably a second sealing element, whereby the first sealing element engages to the female coupling element and the second sealing element engages the male coupling element. The advantage of this arrangement is that it prevents the penetration of dirt into the vicinity of the connection between the two coupling elements. The reliability and security of the connecting and release processes can thereby be increased. As a result of the elasticity of the first sealing element, together with a projection that acts as a snap-in lug and is engaged in a groove, it is possible to position the release device correctly and to pull the sealing element onto the female coupling element.

In an advantageous refinement of the invention, when the two coupling elements are connected, the sealing element is in contact and creates a seal with one end surface of the female coupling element.

In an additional advantageous refinement of the invention, the indicator element is realized in the form of an indicator pin which is held by the release device so that it can be moved axially, so that the indicator pin, during the connection of the two coupling elements, comes into contact with the end surface of the female coupling elements and is displaced axially. In this case, the release device is very simple and can be manufactured very economically. The indicator feature requires only one indicator pin and one passage boring in the release device. If desired, of course, a plurality of indicator pins distributed peripherally can also be provided.

In one advantageous refinement of the invention, the indicator element is realized in the form of an indicator ring which is located on the male coupling element in a defined position, from which the indicator ring is displaced in the axial direction during the coupling process. Here again, all that is necessary to provide an indicator element is a simple design measure.

In one advantageous refinement of the invention, the male coupling element has a groove in which the indicator ring, which is designed to be expandable, lies in its defined position. The advantage of this arrangement is that in addition to the indicator ring which serves as an indicator element, the snap-ring groove is available as an additional indicator element. For example, if this groove can be inspected visibly or by feel from the outside, it can be determined whether the connection has been made correctly.

One embodiment of the coupling device claimed by the invention is characterized by the fact that the indicator element is formed by a marking which is provided on one of the end surfaces of the female coupling element, which marking—when the two coupling elements are connected—is at least partly covered by the sealing element. In other embodiments of the indicator described above (i.e. the indicator ring or indicator pin), the correctly coupled status of the coupling elements is indicated by the fact that the indicator element is displaced from its defined position. Therefore, the correctly coupled condition is indicated by its "visible conspicuousness". In the embodiment with the marking, however, the correctly coupled condition is indicated by the fact that the indicator element is not visible or is only partly visible.

In one embodiment of the invention, the marking is a color marking which differs in terms of color from the sealing element and/or the end surface. It therefore becomes very easy to determine visually whether the coupling element has been connected properly.

One preferred embodiment of the invention is characterized by the fact that the marking is realized in the form of a ring which lies concentric to an interior space of the female coupling element. When the coupling elements are connected, the ring is preferably completely covered by the sealing element, so that the user can determine whether the coupling has been correctly connected by examining the coupling from any direction.

One preferred embodiment is characterized by the fact that the marking is formed by an insert which is located or inserted in a groove which emerges on the end surface. This insert can be attached in a particularly permanent manner, so that the correctly coupled status can still be reliably indicated even after many coupling and uncoupling operations.

In one preferred embodiment of the invention, the groove is realized in the form of a snap-ring groove into which the preferably ring-shaped insert can be inserted.

In one refinement of the invention, the insert is realized in the form of a plastic part. This plastic part can be manufactured particularly easily and economically, and can be held in the groove by adhesives, for example.

In one advantageous embodiment of the invention, the release device has a first longitudinal segment and a second longitudinal segment, whereby the outside diameter of the first longitudinal segment is larger and the outside diameter of the second longitudinal segment is smaller than the inside diameter of the female coupling element.

Additional embodiments of the invention are described in the specification and claims.

The embodiments of the invention described above can be combined with one another in any desired combination without thereby exceeding the scope of the invention.

IN THE DRAWINGS

The invention is explained below with reference to the exemplary embodiments illustrated in the accompanying figures, in which:

FIGS. 1A and 1B show a coupling device, schematically illustrated in longitudinal section, in two different coupling positions.

FIG. 3 shows details of an additional embodiment of a coupling device, in which the coupling device is shown in the uncoupled state.

FIG. 4 shows details of the coupling device illustrated in FIG. 3, whereby the coupling device is shown in the coupled state.

DESCRIPTION OF THE PREFERRED EMBODIMENTS

Figure 1A:
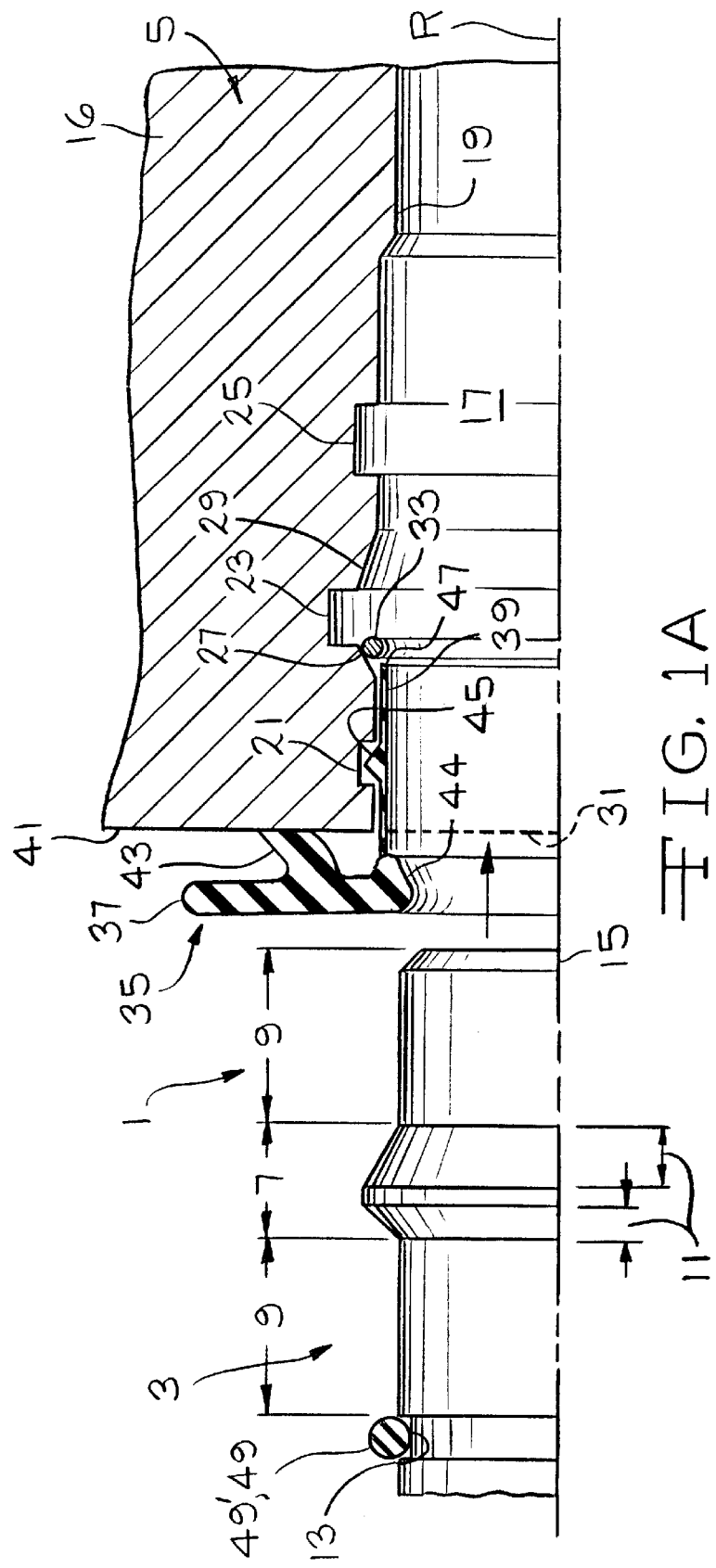

FIG. 1A shows a coupling device 1. For each of understanding, only the portion of the coupling device essential to the invention is shown. The coupling device 1 comprises a male coupling element 3 and a female coupling element 5. Both the male coupling element 3 and the female coupling element 5 are rotationally symmetrical components, so that for purposes of simplification of the illustration, only the upper half in relation to the axis of rotation R is shown. Naturally, however, other shapes are also conceivable.

The male coupling element 3, which is hereinafter called a nipple, is formed in the shape of a tube and can be used, for example, by means of a threaded connection or a fitting, to connect a tube or a hose. The nipple 3 has a longitudinal segment 7 which has an outside diameter which is greater than that of the adjacent longitudinal segments 9. The increase in the outside diameter is progressive, so that the longitudinal segments 11 are conical.

The nipple 3 has a snap-ring groove 13 which is provided in a longitudinal segment 9 which is on the opposite side of the longitudinal segment 7 from the free end 15.

The female coupling element 5, which is hereinafter called a socket, is also formed in the shape of a tube and can be used to connect a tube or a hose, for example. It is also conceivable that the female coupling element 5 can be integrated into a coupling block for the direct connection of the nipple 3. The example described below, however, relates to a female coupling element adapted to be connected to a length of tubing or hose. The corresponding connection region is not shown in FIGS. 1A and 1B. A wall 16 of the socket 5 encloses an interior space 17 which has a circular cross-section and is in the form of a receptacle for receiving a longitudinal segment of the nipple 3. The nipple 3 and the socket 5 are to be used to create a tight connection between the tubes or hoses connected to the two elements.

Formed in an inner wall of the 19 of the socket 5, are three grooves 21, 23, 25 which are spaced apart from one another in the longitudinal direction. The distances (radii) of the three grooves 21, 23, 25 from the axis of rotation R are different.

The center groove 23 in FIGS. 1 A and 1 B includes two surfaces 27 and 29 which are each disposed at an acute angle to the axis of rotation R. The surface 27 lies closer to the end 31 than the surface 29.

In the vicinity of the center groove 23 there is a split clip 33 which, as illustrated in FIGS. 1A and 1B, is in contact with the surface 27. The split clip 33 can be expanded to a larger diameter. Preferably, the type of split clip 33 used is a snap ring which can be separated at one point. The diameter of this split clip 33 in its unexpanded condition is selected so that it is somewhat greater than the inside diameter of the interior space 17 in the area of the groove 23.

The coupling device 1 also has a release device 35 which has a ring-shaped longitudinal segment 37 and a tubular longitudinal segment 39. The ring-shaped longitudinal segment 37, which is hereinafter designated the release grip, has an inside diameter which is approximately equal to the outside diameter of the groove 13 of the nipple 3. The outside diameter of the release grip 37 can be designed to meet the requirements of the specific application, although it must be guaranteed that the release grip 37 can be operated manually.

On the side of the release grip 37 facing the end surface 41 of the socket 5, there is a ring-shaped axial sealing lip 43. The sealing lip 43, viewed in the radial direction, lies approximately in the middle between the inner and outer edges of the release grip 37.

On the side of the release grip 37 facing the nipple 3 there is an additional radial seal 44 which interacts with the groove 13 when the socket 5 and nipple 3 are connected to one another.

Both the sealing lip 43 and the seal 44 are preferably fabricated from a soft rubber.

The tubular longitudinal segment 39, which is hereinafter designated the actuator element, is connected with the release grip 37, whereby the connecting point lies in an interior area of the release grip 37 facing the axis of rotation R. The axial length of the actuator element 39 is such that, when in the position shown in FIGS. 1A and 1B, its end is slightly spaced from the split clip 33 but is such as to contact and move the split clip when a force F causes displacement of the release device toward the end surface 41. On the outside of the actuator element 39, there is a projection 45 which extends in a direction lateral to the axis and acts as a snap-in lug, whereby the height of the projection 45 is less than the depth of the groove 21 in the socket 5. The axial distance between the projection 45 and the release grip 37 is selected so that it is somewhat greater than the distance from the groove 21 of the socket 5 to the end surface 41. The surface of the projection 45 facing the end surface 41 runs at an acute angle with respect to the axis R, while the other surface runs at a flat angle with respect to the axis R. The release device 35 is thereby easy to insert into the socket 5, but difficult to release.

To make it possible to insert the nipple 3 into the socket 5, the actuator element 39 is designed so that it is expandable in the radial direction. This is accomplished by means of a slot that runs in the axial direction.

FIG. 1A shows clearly that the release device 35 has been inserted into the socket 5. The actuator element 39 thereby lies almost completely in the interior space 17, whereby the projection 45 is engaged in the groove 21 of the socket 5. The end 47 of the actuator element 39 facing away from the release grip 37 is directly next to the split clip 33, without having any contact with the split clip 33. The outside diameter of the actuator element 39 is selected so that it is guided such that the actuator element can be displaced in the axial direction with some slight radial clearance through the inner wall 19 of the socket 5. The axial movement is restricted by the axial dimension of the groove 21. The two walls of the groove 21 serve as stop surfaces for the projection 45, so that the actuator element 39 is prevented from slipping out of the interior space 17. Nevertheless, a defined amount of axial movement must still be guaranteed. The length of this movement is approximately equal to the axial distance between the split clip 33 and the groove 23.

When the release device 35 is inserted into the socket 5, the release grip 37 lies essentially parallel to the end surface 41 of the socket 5, whereby the sealing lip 43 which forms a sealing element is in a seal-creating contact against this end surface 41. The sealing lip 43 is formed so that it elastic, and so that the release grip 37 can be pushed axially toward the end surface 41, whereby the actuator element 39 is simultaneously displaced. Simultaneously, the sealing lip 43, as a result of its elasticity, guarantees that the projection 45 is pressed against the wall of the groove 21 facing the end surface 41. In this manner, on one hand the actuator element 39 can be positioned, and on the other hand, as the result of the pre-stress applied to it, the sealing lip 43 is pressed against the end surface 41.

The coupling device 1 also has an indicator element 49' which is this embodiment is realized in the form of an indicator ring 49 with an expandable diameter. In its unexpanded condition, this indicator ring 49 lies in the groove 13 of the nipple 3. The inside diameter of the indicator ring 49 lies in the groove 13 of the nipple 3. The inside diameter of the indicator ring 49 is therefore approximately equal to the outside diameter of the groove 13. The indicator ring 49 is realized so that it can be displaced out of the groove 13 by the application of a force which acts in the axial direction.

FIG. 1B shows the coupling device 1 illustrated in FIG. 1A, whereby the parts that are identical in the two figures are identified by the same reference numbers. Therefore the parts in FIG. 1B that are identical to the parts in FIG. 1A are not described again in any detail below. In contrast to the situation illustrated in FIG. 1A, in FIG. 1B the two coupling elements 3, 5 are connected to one another, so that a hydraulic connection is achieved between the tube connected to the nipple 3 and the tube which is connected to the socket 5.

The nipple 3 has a longitudinal terminal segment 51 positioned in the interior space 17 of the socket 5. This longitudinal terminal segment 51 extends from the end 53 of the nipple 3 essentially to the groove 13. On the inner wall 19 of the interior space 17 there is a conical surface 55 which acts as a stop for the nipple 3 and which interacts with the end 53 of the nipple. The purpose of this stop is to prevent the nipple 3 from being inserted too far into the interior space in the axial direction.

The split clip 33 prevents a displacement of the nipple 3 in the opposite direction, i.e. out of the interior space 17, by creating a clamping action between the surface 27 of the socket 5 and the surface of the conical longitudinal segment 11 that faces the end surface 41. The nipple 3 is thereby firmly but detachably connected to the socket 5.

To seal the connection, there is an O-ring 57 in the groove 25 which seals the gap between the socket 5 and the nipple 3. To support the O-ring 57 under pressure, there is also a back-up ring 59 in the groove 25.

When the nipple 3 is inserted in the socket 5, the surface of the release grip 37 that faces the axis R forming the radial seal 44 slides over the outer cylindrical surface of the nipple 3, whereby when the coupling is connected, this radial seal 44 is engaged in the groove 13. Prior to that, however, the release lever 37 presses the indicator ring 49 out of the groove 13. The indicator ring 49, which can then be moved freely, indicates that the connection of the nipple 3 and the socket 5 has been made properly. If the indicator ring 49 is not visible, a manual inspection must also be performed. If the person performing the inspection is able to feel the moveable indicator ring 49, the connection is correct.

By means of the sealing lip 43 which forms a seal with the end surface 41, and the radial seal 44 which snaps into in the groove 13, a very good seal is achieved against the penetration of dirt into the interior space 17 or into the space between the socket 5 and the nipple 3.

The advantage of this coupling device 1 is that, using simple means, a release device 35 is created that also seals the interior space and also indicates a correct connection.

To release the nipple 3 from the socket 5, an axial force F directed toward the end surface 41 is applied to the release grip 37. This force causes a displacement of the actuator element 39 in the direction of the force F. The end 47 of the actuator element 39 thereby pushes the split clip 33 over the surface of the conical longitudinal segment 11 up and at an angle with respect to the axis of rotation R. As soon as the split clip 33 lies inside the groove 23, the nipple 3 can be extracted from the socket 5.

Figure 2:
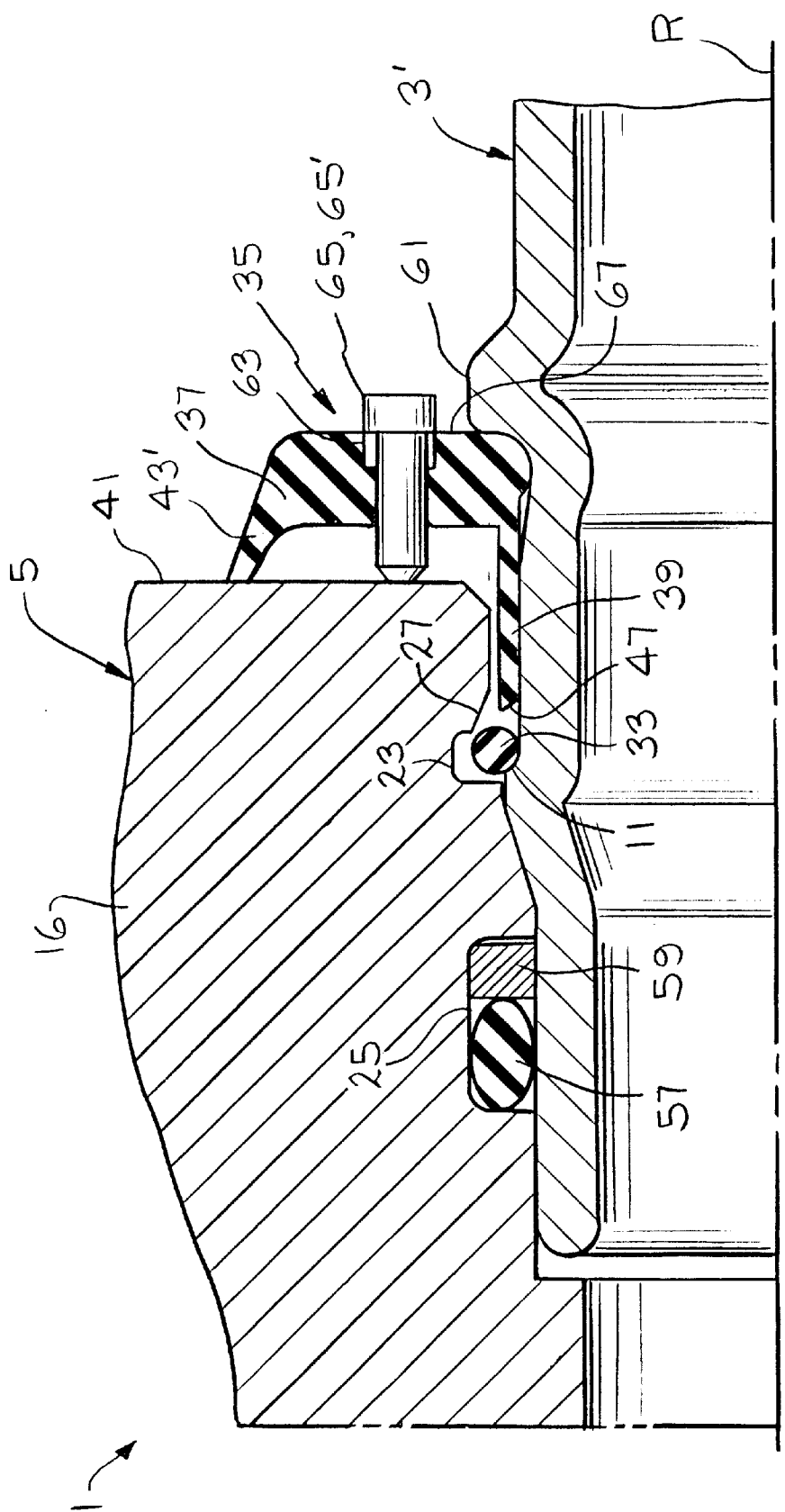
FIG. 2 shows a coupling device, schematically illustrated in longitudinal section, of a second exemplary embodiment of the invention.

FIG. 2 shows an additional embodiment of a coupling device 1.

The parts which correspond to the parts in the embodiment illustrated in FIG. 1 are all identified with the same reference numbers, which makes the repetition of a detailed description of these items unnecessary.

The socket 5 and the nipple 3' are again connected by means of the split clip 33 which produces a clamping action between the two conical surfaces 11 and 27.

In contrast to the configuration of the nipple 3 illustrated in FIG. 1, the nipple 3' in this embodiment has a bead 61 which provides axial support for the release device 35 during the introduction of the nipple 3' into the socket 5. The release grip 37 in turn comprises a sealing lip 43' which, in contrast to the sealing lip 43 of the first embodiment, is attached on the outer peripheral region—viewed in the radial direction.

The release grip 37 has a bore 63 which runs in the axial direction and runs all the way through the release grip. An indicator pin 65 is inserted into this bore so that it can move and forms an indicator element 65'. The length of the indicator pin 65 is greater than the distance between an outer end surface 67 of the release grip 37 and the end surface 41 when the nipple 3' and the socket 5 are connected to one another. Of course, there can also be a plurality of indicator pins distributed around the periphery of the release grip 37.

When the nipple 3' is inserted into the socket 5, the end of the indicator pin 65 comes into contact with the end surface 41 and, as the nipple 3' is inserted further, the indicator pin 65 is pushed out of the bore 63. The head of the indicator pin 65 projects beyond the end surface 67 and indicates a correct connection of the nipple 3' and the socket 5. Of course, when the individual parts are appropriately sized, the invention teaches that when the nipple 3' and the socket 5 are connected, the indicator pin 65 can also be made to fall out of the bore 63 altogether.

The coupling device illustrated in FIG. 2 has the advantage that the release device 35, in addition to its inherent function of releasing the connection, can easily perform two additional functions, namely on one hand the indication of a correct connection of the two coupling elements 3', 5 and on the other hand the sealing of the interior space 17 against the penetration of dirt. For this purpose, only two additional components are necessary, namely the indicator pin 65 and the sealing lip 43'.

Of course, it is conceivable to form the actuator element 39 so that it is not tubular, but consists only of two actuator arms or actuator segments located at some distance from one another in the peripheral direction.

FIG. 3 shows a coupling device 1' which differs from the embodiment illustrated in FIG. 2, and is shown only partly and in cross-section. The parts—where shown—that are identical to the parts in FIG. 2 are identified by the same reference numbers. The description of these identical parts is not repeated below. In the end surface 41 of the socket 5 there is a groove 69 which can be formed in the shape of an encircling groove or a snap-ring groove 71. Inserted into the groove 69 or the snap-ring groove 71 is a part 73 which can be a plastic part 75. This part 73 is preferably a different color than the end surface 41 and/or a sealing lip 43". The part 73 thereby forms a marking 77 which serves as an indicator element 77'. The marking 77 or the part 73 or the plastic part 75 is preferably formed in the shape of a ring which can be inserted or placed in the snap-ring groove 71. It thereby forms an insert which is preferably completely contained by the groove 69 or the snap-ring groove 71, and thus does not project beyond the end surface 41.

The indicator element 77' or the marking 77 is visible in the uncoupled or partly coupled state of the coupling device 1 illustrated in FIG. 3, because the sealing lip 43" is not in contact with the end surface 41. In one preferred embodiment of the invention, the sealing lip 43" is realized so that it is somewhat longer than the sealing lip 43' of the embodiment of FIG. 2. The sealing lip 43" is preferably made of an elastic material, in particular soft rubber.

FIG. 4 illustrates the correctly coupled state of the coupling device 1'. When the nipple 3' is inserted into the socket 5, the sealing lip 43" comes into contact with the end surface 41. Because the sealing lip 43" runs at an angle with respect to the end surface 41, the sealing lip 43" is bent upward, and comes to lie on the end surface 41 and on the marking 77 or on the indicator element 77' with its inner surface 79. The length of the sealing lip 43" is preferably selected so that when the coupling device 1' is correctly coupled, the marking 77 is completely covered, because the outside diameter of the sealing lip 43" of the release grip 37 is increased. It is thereby possible to determine unambiguously that the coupling has been connected properly.

Of course, instead of the part 73 or the insert and the groove 69 or snap-ring groove 71, there can be only a painted area on the end surface 41 which, like the marking 77, forms the indicator element 77'. The color marking or the part 73 can be made so that it is fluorescent or contains fluorescing materials, so that even under unfavorable lighting conditions, it makes possible an unambiguous and easily readable indication of the coupling.

Of course, it is also possible to provide the indicator element 77' described in relation to FIGS. 3 and 4 for the coupling device 1 illustrated in FIGS. 1a and 1b, so that the sealing lip 43 interacts with the indicator element 77'.

I claim:

1. A coupling device comprising a male coupling element and a female coupling element having an open end sized to receive said male coupling element and an end surface adjacent said open end, an expandable split clip for locking said male coupling element in engagement with said female coupling element and an axially moveable release device which interacts with the split clip to release said male coupling element from said engagement, said release device including an indicator element which indicates a connection between the male and female coupling elements characterized in that said release device comprises an annular sealing element which engages said end surface of the female coupling element when said male and female coupling elements are connected to one another and by the fact that said indicator element includes at least one indicator pin which is held by said release device and axially displacable relative thereto upon connection of said male and female coupling elements, said indicator pin contacting with said end surface of said female coupling element.

2. A coupling device comprising a male coupling element and a female coupling element having an open end sized to receive said male coupling element and an end surface adjacent said open end, an expandable split clip for locking said male coupling element in engagement with said female coupling element and an axially moveable release device which interacts with the split clip to release said male coupling element from said engagement, said release device including an indicator element which indicates a connection between the male and female coupling elements characterized in that said release device comprises an annular sealing element which engages said end surface of the female coupling element when said male and female coupling elements are connected to one another and by the fact that said indictor element comprises an indicator ring located in a defined position on said male coupling element positioned to be axially displaced from said defined position by said release device upon connection of said male and female coupling elements.

3. A coupling device comprising a male coupling element and a female coupling element having an open end sized to receive said male coupling element and an end surface adjacent said open end, an expandable split clip for locking said male coupling element in engagement with said female coupling element and an axially moveable release device which interacts with the split clip to release said male coupling element from said engagement, said release device including an indicator element which indicates a connection between the male and female coupling elements characterized in that said release device comprises an annular sealing element which engages said end surface of the female coupling element when said male and female coupling elements are connected to one another and said indicator element comprises a marking provided on the end surface of said female coupling element, said marking positioned to be least partly covered by said annular sealing element when said male and female coupling elements are connected.

4. A coupling device as claimed in claim 3, characterized by the fact that said marking is a color marking which is a different color from said sealing element or said end surface.

5. A coupling device as claimed in claim 3 or 4, characterized by the fact that said marking is in the form of a rind on the end surface of said female coupling element.

6. A coupling device as claimed in claim 3, characterized by the fact that said marking is an insert located in a groove formed in said end surface.

7. A coupling device as claimed in claim 6, characterized by the fact that the groove is in the form of a snap-ring groove.

8. A coupling device as claimed in claim 6 or 7, characterized by the fact that said insert is in the form of a plastic part.

9. A coupling device comprising a male coupling element and a female coupling element having an open end sized to receive said male coupling element and an end surface adjacent said open end, an expandable split clip for locking said male coupling element in engagement with said female coupling element and an axially moveable release device which interacts with the split clip to release said male coupling element from said engagement, said release device including an indicator element which indicates a connection between the male and female coupling elements characterized in that said release device comprises an annular sealing element which engages said end surface of the female coupling element when said male and female coupling elements are connected to one another and said indicator element comprises an indicator ring located in a groove of said male coupling element positioned so that said indicator ring is axially displaced from said groove by said release device upon connection of said male and female coupling elements.

10. A coupling device comprising a male coupling element and a female coupling element having an open end sized to receive said male coupling element and an end surface adjacent said open end, an expandable split clip for locking said male coupling element in engagement with said female coupling element and an axially moveable release device which interacts with the split clip to release said male coupling element from said engagement, said release device including an indicator element which indicates a connection between the male and female coupling elements characterized in that said release device comprises an annular sealing element which engages said end surface of the female coupling element when said male and female coupling elements are connected to one another and said indicator element comprises an indicator ring located in a groove of said male coupling element positioned so that said indicator ring is axially displaced from said groove by said release device and said second sealing element is in a seal-creating radial contact with said groove upon connection of said male and female coupling elements.

11. A coupling device comprising a male coupling element and a female coupling element having an open end sized to receive said male coupling element and an end surface adjacent said open end, an expandable split clip for locking said male coupling element in engagement with said female coupling element and an axially moveable release device which interacts with the split clip to release said male coupling element from said engagement, said release device including an indicator element which indicates a connection between the male and female coupling elements characterized in that said release device comprises an annular sealing element which engages said end surface of the female coupling element when said male and female coupling elements are connected to one another, said release device having a first segment with an outside diameter greater than the inside diameter of said female coupling element and a second longitudinal segment with an outside diameter smaller than the inside diameter of the female coupling element, said second longitudinal segment having a projection that extends radially and interacts as a snap-in element with a groove provided in the female coupling element so that said the sealing element is pressed against the end surface of said female coupling element.

12. A coupling device comprising a male coupling element and a female coupling element having an open end sized to receive said male coupling element and an end surface adjacent said open end, an expandable split clip for locking said male coupling element in engagement with said female coupling element and an axially moveable release device which interacts with the split clip to release said male coupling element from said engagement, said release device including an indicator element which indicates a connection between the male and female coupling elements characterized in that said release device comprises an annular sealing element which engages said end surface of the female coupling element when said male and female coupling elements are connected to one another, said release device having a first segment with an outside diameter greater than the inside diameter of said female coupling element and a second longitudinal segment with an outside diameter smaller than the inside diameter of the female coupling element, said second longitudinal segment being expandable radially.

13. A coupling device comprising a male coupling element and a female coupling element having an open end sized to receive said male coupling element and an end surface adjacent said open end, an expandable split clip for locking said male coupling element in engagement with said female coupling element and an axially moveable release device which interacts with the split clip to release said male coupling element from said engagement, said release device including an indicator element which indicates a connection between the male and female coupling elements characterized in that said release device comprises an annular sealing element which engages said end surface of the female coupling element when said male and female coupling elements are connected to one another, said release device having a first segment with an outside diameter greater than the inside diameter of said female coupling element and a second longitudinal segment with an outside diameter smaller than the inside diameter of the female coupling element, said second longitudinal segment having slots that run in the axial direction.

* * * * *